(12) United States Patent
King et al.

(10) Patent No.: US 7,060,190 B2
(45) Date of Patent: Jun. 13, 2006

(54) DUAL DISPENSER

(75) Inventors: Joseph A. King, Wayzata, MN (US); Jeffery Johnson, Minneapolis, MN (US); Micheal Pontius, Mora, MN (US)

(73) Assignee: King Technology

(*) Notice: Subject to any disclaimer, the term of this patent is extended or adjusted under 35 U.S.C. 154(b) by 164 days.

(21) Appl. No.: 10/636,820

(22) Filed: Aug. 7, 2003

(65) Prior Publication Data

US 2004/0168963 A1 Sep. 2, 2004

Related U.S. Application Data

(60) Provisional application No. 60/450,095, filed on Feb. 27, 2003.

(51) Int. Cl.
*C02F 1/76* (2006.01)

(52) U.S. Cl. .............. 210/754; 137/268; 210/764; 210/169; 210/198.1; 210/232; 210/242.1; 222/1; 222/129; 222/185.1; 422/37; 422/265

(58) Field of Classification Search ............ 210/749, 210/754, 169, 198.1, 205, 232, 242.1; 422/37, 422/265; 222/1, 129, 164, 185.1
See application file for complete search history.

(56) References Cited

U.S. PATENT DOCUMENTS

| | | | | |
|---|---|---|---|---|
| 4,208,376 | A | * 6/1980 | Sangster et al. | ............ 422/261 |
| 4,630,634 | A | 12/1986 | Sasaki et al. | ................ 137/268 |
| 4,702,270 | A | 10/1987 | King, Sr. | ..................... 137/268 |
| 4,917,868 | A | * 4/1990 | Alexander et al. | ........... 422/119 |
| 5,055,183 | A | 10/1991 | Buchan | ....................... 210/85 |
| 5,407,567 | A | 4/1995 | Newhard | .................. 210/198.1 |
| 6,123,842 | A | 9/2000 | Buchan | ....................... 210/169 |
| 6,200,487 | B1 | * 3/2001 | Denkewicz et al. | ........ 210/749 |
| 6,340,431 | B1 | 1/2002 | Khan | ........................... 210/85 |
| 6,625,821 | B1 | * 9/2003 | Lhoste | .......................... 4/231 |

FOREIGN PATENT DOCUMENTS

EP 1042234 11/2000

* cited by examiner

*Primary Examiner*—Peter A. Hruskoci
(74) *Attorney, Agent, or Firm*—Jacobson & Johnson (57) ABSTRACT

A cartridge holder and a floating dispenser system for dispensing materials into a fluid with the floating dispenser system including a cartridge holder with receptacles for removably attaching or detaching at least two cartridge dispensers therein to allow one to simultaneously dispense materials into a fluid system by placing the floating dispensing system in a body of fluids and to replenish the system by merely removing and replacing a cartridge in the holder.

23 Claims, 5 Drawing Sheets

FIG. 13

DUAL DISPENSER

CROSS REFERENCE TO RELATED APPLICATIONS

This application claims benefit of provisional patent application 60/450,095 filed Feb. 27, 2003 titled Floating Dispensing System.

FIELD OF THE INVENTION

This invention relates generally to fluid dispensing systems and, more specifically, to a dispensing system for a body of fluid which is maintained at least partially above the fluid line and at least partially below the fluid line to permit dispensing of material into the body of fluid.

STATEMENT REGARDING FEDERALLY SPONSORED RESEARCH OR DEVELOPMENT

None

REFERENCE TO A MICROFICHE APPENDIX

None

BACKGROUND OF THE INVENTION.

The concept of a single floating dispenser for use in dispensing materials is known in the art. For example, U.S. Pat. No. 4,702,270 discloses a floating dispenser having materials therein for treatment of water. The present invention provides a floating dispensing system including a separable holder that when secured to at least two cartridge dispensers floats with a portion above the fluid line and a further portion including the dispenser cartridges below the fluid line to permit the simultaneous dispensing of two or more materials into the body of fluid. The present invention allows one to quickly change one or both of the cartridge dispensers and maintain each of the cartridge dispensers in one location in the body of fluid.

SUMMARY OF THE INVENTION

A floating dispenser system for dispensing materials into a fluid with the floating dispenser system including a holder with receptacles for removably attaching or detaching at least two cartridge dispensers therein to allow one to dispense materials into a fluid system by placing the floating dispensing system in a body of fluids and to replenish the system by merely removing and replacing a cartridge in the holder. If desired a color coded system permits quick visually identification of the contents of the dispenser cartridges.

DESCRIPTION OF THE PREFERRED EMBODIMENT

Figure 1:
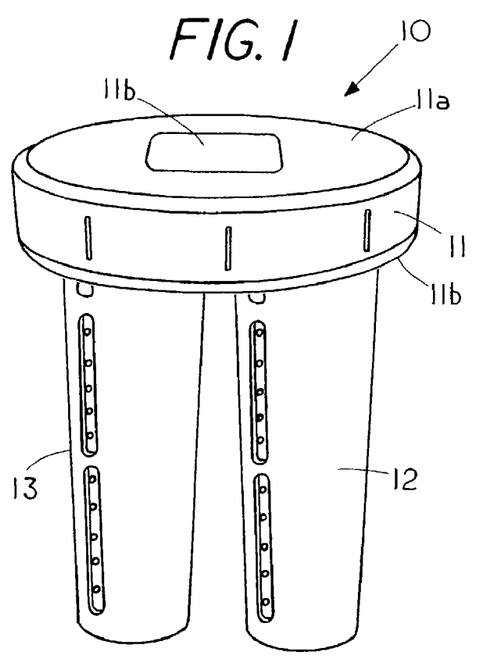
FIG. 1 is a perspective of the floating dispenser system with two cartridge dispensers removable secured therein.

FIG. 1 shows a floating dispenser system 10 comprising an elongated cartridge holder 11, which is preferable a buoyant member, having a top side 1a and a bottom side 11b with the top side normally located at least partially above a water surface and the bottom side 11b normally located below the water surface when the system is placed in a body of water. Removably attached to the bottom side 11b is a first cartridge dispenser 12 containing a first fluid dispensable material (not shown). The first cartridge dispenser 12 can be temporarily securable to the bottom side 11b of holder 11 through a friction fit, threads or other engaging members to enable one to both secure and remove the cartridge dispenser from the holder 11. Similarly, attached to holder 11 is a second cartridge dispenser, containing a second fluid dispensable material (not shown) with the second cartridge dispenser also temporarily securable to the bottom side 11b of cartridge holder 11 to enable dispensing of fluid treatment material therefrom. Thus the floating dispensing system enables one to have either or both of cartridge dispensers in a condition to dispense fluid treatment material therefrom as the floating dispensing system floats in a body of fluid. While the present system is suitable for dispensing materials in any type of fluid the present invention is ideally suited for use in recreational liquids such as the water systems found in spas, hot tubs and the like.

Figure 2:
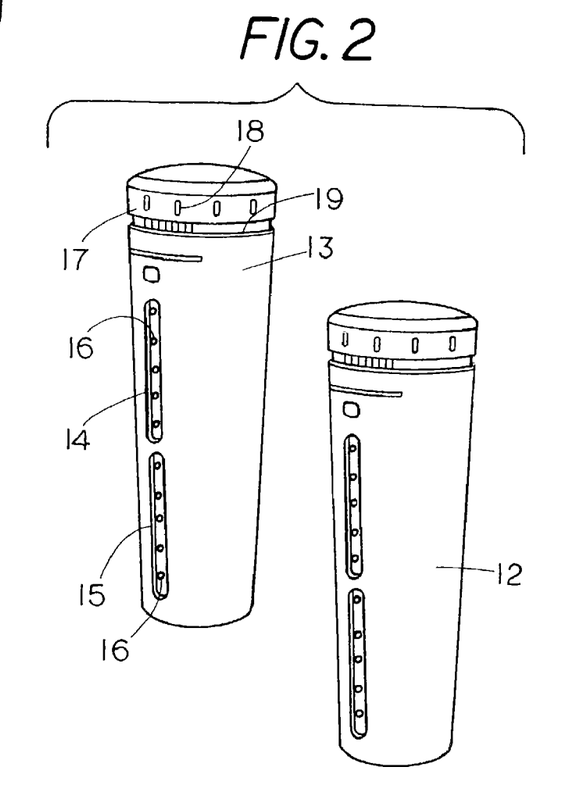
FIG. 2 is an isolated view of the cartridges dispensers for use in the present invention.

FIG. 2 shows the two cartridge dispensers 12 and 13 in a side by side condition. As the two cartridge dispensers are identical only one is described herein. Cartridge dispenser 13 includes a cap 17,that connects to a cartridge dispenser container 19 having a set of openings 16 therein. A sleeve like member or dispersant rate selector 13 circumferentially encompasses the dispenser container 19 and has a first elongated slot 14 and a second elongated slot 15 which is shown in alignment with the holes or openings 16 in the dispenser container 19. Dispenser container 17 is rotateable with respect to dispersant rate selector 13 to permit more or less openings 16 to be visible in the elongated slots 14 and 15 and thus provide a fluid path from the interior of the cartridge dispenser container 17 to the exterior fluid surrounding the cartridge dispenser container 17. With more of the openings 16 visible in elongated slots 14 and 15 more fluid can get access to the contents of the cartridge dispenser container 17 and with less openings visible in elongated slots 14 and 15 less fluid can get access to the contents of the cartridge dispenser container. As the dispenser cartridges 12 and 13 are identical only one is described herein; however, the present system is suitable for use with cartridges dispensers that may not be identical.

Figures 3, 4:
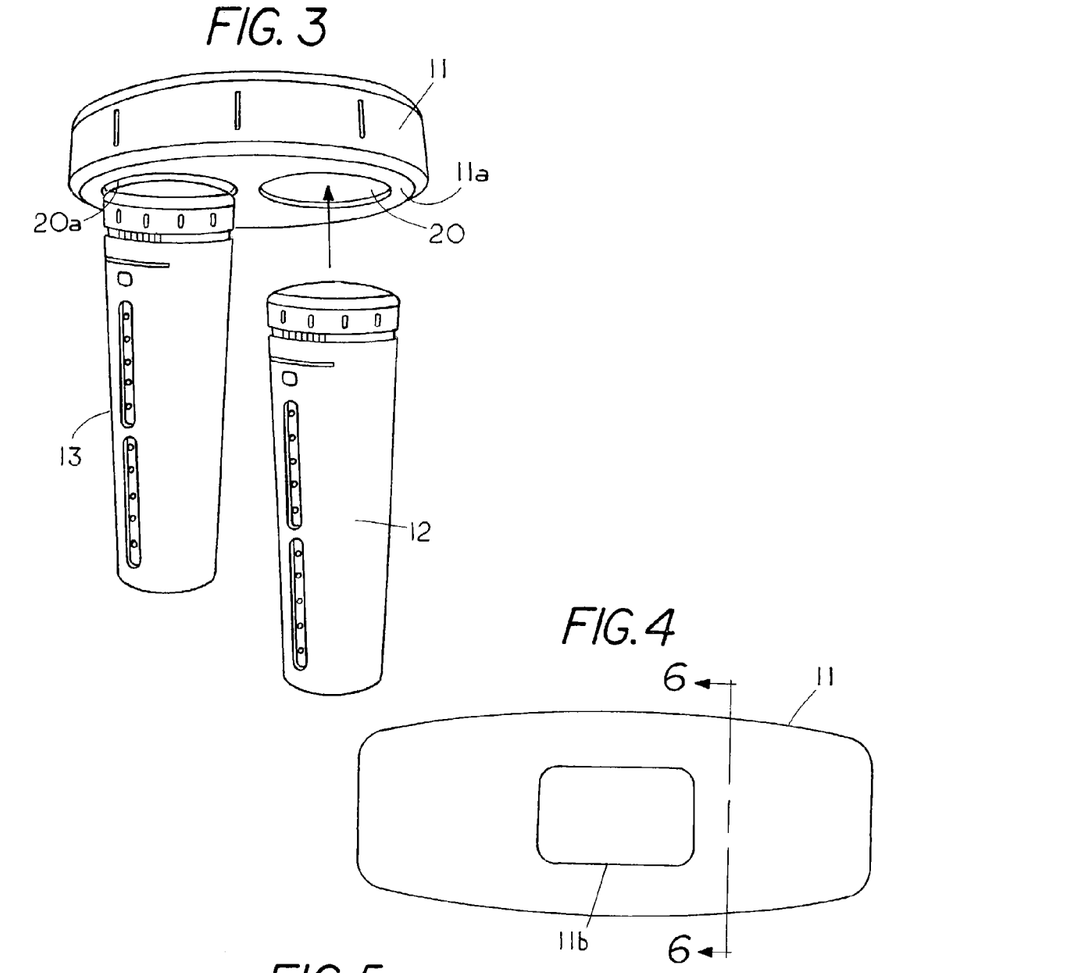
FIG. 3 is an exploded view illustrating the assembly of the cartridge dispensers and the cartridge holder.
FIG. 4 is a top view of the cartridge holder for holding two cartridge dispensers in a side by side condition.

FIG. 3 shows the elongated cartridge holder 11 with a first cylindrical cartridge recess 20 extending upward in the bottom of holder 11 and a second cartridge recess 20a extending upward into holder 11. Located in a recess 20 in holder 11 is a fastening device for temporarily securing the cartridge dispenser 12 to the holder 11 and similarly located in the opposite end of holder 11 is the second recess 20a. Located within the second recess 20a of holder 11 is a second fastening device for temporarily securing the cartridg e dispensers 13 to the holder 11. An advantage of having a removable cartridge is allows one to provide for interchanging cartridge dispensers or to allow one remove and replace a spent cartridge dispenser. This feature is particularly beneficially when one of the materials within the cartridge dispenser has a longer dispensing life than the other. Consequently, only the spent cartridge dispenser needs to be replaced rather than the entire system.

In the preferred embodiment, when used in water treatment, the floating dispenser system 10 can hold two different dispensing materials. To aid the user in identifying the cartridges containing the different dispensing materials, when the cartridge dispensers have the identical shape and size one can color code the cartridge dispensers, for example, one cartridge could be a blue mineral cartridge 12, which yields ions, and the second cartridge could be a yellow bromine cartridge 13 which yields bromine. The color coding permits a user to quickly identify the contents of the cartridge and the purpose of the cartridge. dispenser. To replace a spent cartridge the user merely removes the spent dispenser cartridge out of the holder and secures a fresh cartridge into position.

FIG. 4 shows a top view of the cartridge holder 11 illustrating that the holder 11 has an elongated shape. A top region 11b can carry product identifying information or instructions on the use of the holder with cartridge dispensers. Preferably, holder 11 made of a lightweight material and includes rounded corners so as not be injurious to the occupants if allowed to float in a spa or hot tub containing the holder and the occupants.

Figure 5:
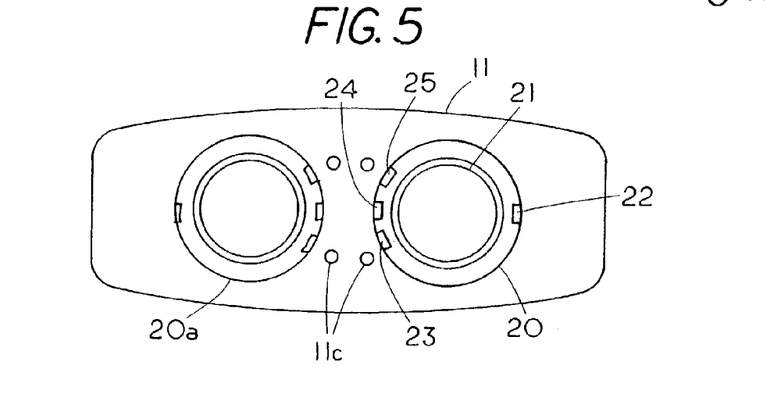
FIG. 5 is a bottom view of the cartridge holder of FIG. 4.

FIG. 5 is a bottom view of cartridge holder 11 showing the side by side location of recess 20 for holding a first cartridge dispenser and recess 20a for holding a second cartridge dispenser. As the recess 20 and 20a and the cartridge engaging members therein are identical only one is described herein. Cartridge holder 11 is hollow and includes a set of four holes 11c allow for fluid to flow in or out of cartridge holder 11.

Located in cylindrical recess 20 is an annular stop 21 for engaging the top of a dispenser cartridge, which can be centrally located in recess 20. Shown projecting radially inward in recess 20 are a set of stops 22, 23, 24 and 25. In the embodiment shown stop 22 is a fixed stop that projects radially inward to engage and support one side of a cartridge dispenser. In contrast, the stops 23, 24, 25, which are located diametrically opposite to support the opposite side of a dispenser cartridge, are retractable stops that move radially inward to permit engagement with a cartridge dispenser and radially outward to permit disengagement with a dispenser cartridge.

Figure 6:
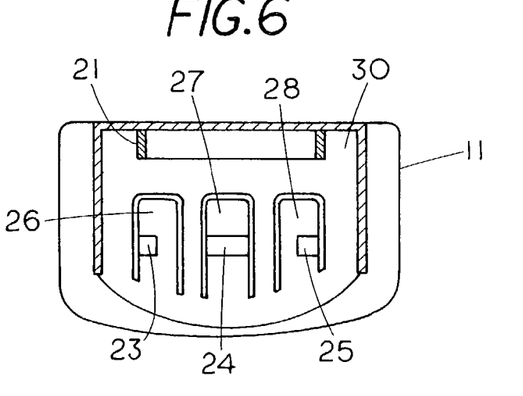
FIG. 6 is a cross sectional view of the cartridge holder of FIG. 4 taken-along lines 6—6.

FIG. 6 shows a sectional view showing the retractable stop 23 mounted on a resilient cantilevered member 26 that has been formed as part of the cylindrical sidewall 30 of holder 11 by forming a U-shaped slot in sidewall 30. Similarly, retractable stop 24 is mounted on a resilient cantilevered member 27 that has also been formed in the cylindrical sidewall 30 by forming a U-shaped slot in sidewall 30. The retractable stop 25 is also mounted on a resilient cantilevered member 28 that likewise has been formed in the cylindrical sidewall 30 by forming a U-shaped slot in sidewall 30. The purpose of having retractable stops is to permit insertion of and securement of a dispenser cartridge to the holder 11 as well as to permit removal of a dispenser cartridge from holder 11, and at the same time maintain a resistance to removal of the cartridge dispenser so as to ensure that when the holder 11 is in use in an environment that can jostle the holder and cartridges the holder 10 will maintain the two cartridge dispensers in the holder 11 in a side-by-side condition.

In order to illustrate the interactive component parts of the cartridge dispenser for use with the holder 11 as well as the component parts that permit engagement of the cartridge dispenser with the holder 11 reference should be made to FIGS. 7–11 which show the four components of a cartridge dispenser in a disassembled condition as well as an assembled condition.

Figure 7:
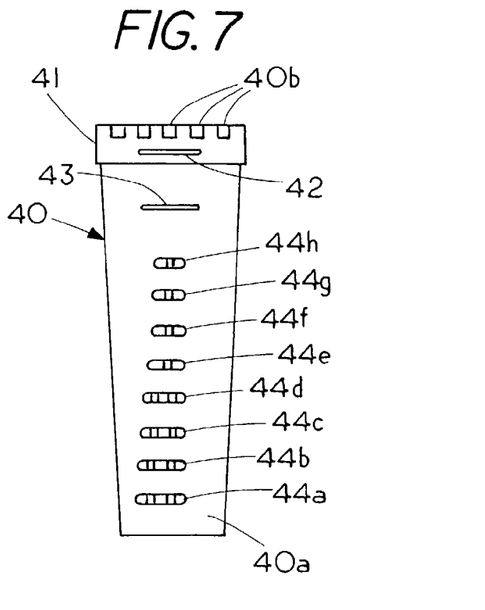
FIG. 7 is a front elevation view of the cartridge container of the cartridge dispenser.

FIG. 7 is a front elevation view of the dispersant container 40 of a cartridge dispenser. Dispenser container 40 has a chamber therein that allows one to contain and hold the dispersant material in a dispersible condition therein. In the embodiments shown the open top cup-like dispersant container 40 comprises a tapered outer sidewall surface 40a. Sidewall surface 40a is sufficiently smooth so as to permit sliding engagement with a surface on another component part of the cartridge dispenser. Located vertically along a longitudinal surface element of dispersant container 40 is a set of openings 44a, 44b, 44c, 44d, 44e, 44f, 44g, and 44h. In the embodiment shown each of the openings contain a grid and each are of different length but all are of the same width. The openings each have the right edge located along a vertical line that extends in an axial direction. The set of openings permit the dispersant in a dispersant chamber in dispersant container 40 to be dispersed through the set of opening therein. The top of dispersant container 40 includes an annular band 41 having raised ribs or gripping members 40b thereon that encompasses the peripheral region of the dispersant container 40 to provide a grasping region for a user. Located on band 41 is an elongated slot 42 for forming mating engagement with a protrusion on one side of a float and similarly located on the oppose side of band 41 is a second elongated slot (not shown) for forming supporting engagement with a protrusion on the opposite side of the float.

Figure 8:
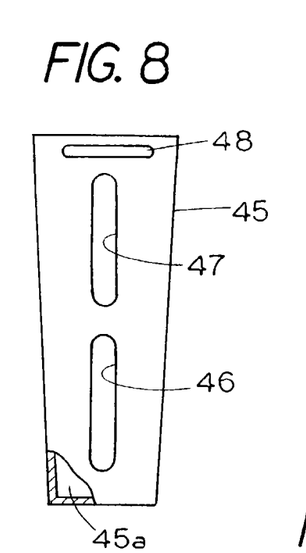
FIG. 8 is a front elevation view of the dispersant fate selector of the cartridge dispenser.

FIG. 8 is a front elevation view of the dispersant rate selector 45 of the cartridge dispenser. Dispersant rate selector 45 comprises a tapered container having an inner smooth surface sidewall 45a that slidingly mates with the exterior surface 40a of dispersant container 40 and a bottom 45a. Dispersant rate selector 45 is slightly larger than dispersant container 40 to allow dispersant container 40 to nest within dispersant selector 45. Dispersant selector 45 includes a first elongated opening 47 and a second elongated opening 46 that extend in an axial direction along the tapered dispersant rate selector 45. As dispersant container 40 and dispersant rate selector 45 nestable mate with each other one can rotate the selector 45 with respect to the container 40. As a result one can align more or less of the set of openings 40a–40g with the elongated openings 46 and 47 thus controlling the size of the dispersant path from interior of container 45 to the exterior of selector 45.

A feature of the present invention is that a float is included that not only provides sufficient buoyancy to maintain the cartridge dispenser and the contents in a buoyant condition but provides a cover for the dispenser container 40 to retain the contents in dispenser container 40. The float 50 comprises a two-part float that can be assembled without the need for welding, adhesives or the like. The dispenser container 40 is shown in an exploded view in FIG. 9 comprising a cylindrical cover or cap 51 having an empty chamber therein and a cylindrical base 52 having an empty chamber 53 therein. Float base 52 includes an outer annular lip 54 that abuts against bottom edge 51*a* of cover 51 and a top tapered lip 55 that forms locking engagement with an interior latching member in cover 51 to provide a leak-proof junction therebetween. Cover 51 comprises a general cylindrical shaped container with a domed top and sidewall with a first radial protrusion 58 and a second radial protrusion 58*a* that are located diametrically opposite from each other. First radial protrusion 58 is for forming locking engagement with first elongated slot 42 on one side of dispersant container 40 and second radial protrusion 58*a* forms locking engagement with a second elongated slot (not shown) on the opposite side of dispersant container 40.

Figure 9:
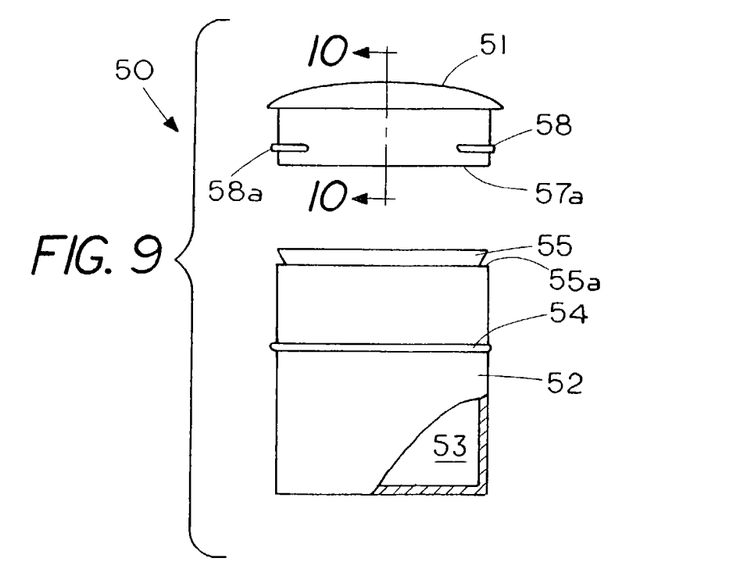
FIG. 9 is an exploded view of a float cover and a float base for a cartridge dispenser.

A leak-proof mechanical locking engagement between the float cover 51 and the float base 52 permits one to form a float without the aid of adhesives, welding or the like. When float cover 51 is assembled to the float base 52, one forms a float that can buoyantly support the dispersant container 40 and the contents therein. Float base 52 and float cover 51 are preferably made of a polymer plastic with the side walls of sufficient thickness to withstand fluid pressure thereon without collapsing and sufficiently thin so as to flex to enable one to slide the protrusion 58 and 58*a* on cover 51 into interlocking engagement with the mating elongated slots on dispersant container 40.

Figure 10:
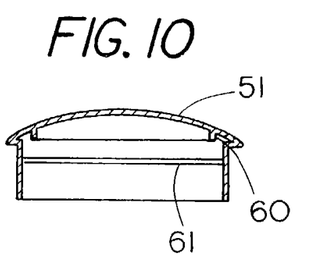
FIG. 10 is a sectional view of the float cover for the cartridge dispenser.

FIG. 10 is a sectional view of the cover 51 of the float showing that an annular top lip 60 and an annular bottom lip 61 are concentricity positioned and extend around the inner peripheral top surface of float cover 51 with top lip 60 having a smaller diameter than bottom lip 61.

Figure 10A:
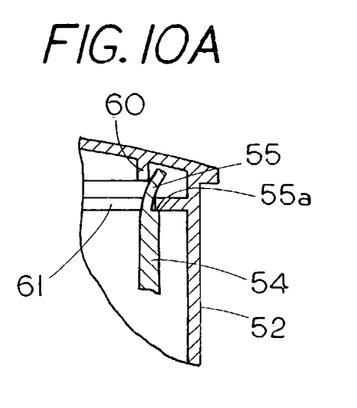
FIG. 10A is a detail view of a set of inter-engaging rings that hold the float cover and the float base in a leak-proof condition.

FIG. 10A is a detail view of the inter-engaging lips or rings 60 and 61 of float cover 51 in engagement with annular lip 55 of float body 52 to form a leak-proof condition between the float cover 51 and the float base 52. As can be seen in FIG. 10A the float 50 need not be welded but can be formed from a cup-shaped float cover 51 and a cup-shaped float base 52 that can be snapped in place much like one seals a food storage container. Once snapped in place the outward angled projection of lip 55 prevents separation of the cover 51 from the base 52 since the lip 55 and lips 60 and 61 form mechanical engagement with each other.

Thus the present invention includes the method of making a float for a cartridge dispenser buy forming a float base 52 with a top lip 55 and a float cover 52 with inter-engaging lips 60 and 61 and then snapping the top lip 55 of the base into engagement,with the inter-engaging lips 60 and 61 of the float cover 52 to form a leak-proof junction therebetween which allows one to form a float without the use of welding, gluing or other material joining methods. Once the float 50 is assembled one can insert the float onto the dispensing container 40 and the float becomes a cover to dispenser container 40 to retain the contents of the dispenser container therein. That is, one can place the dispersant material in container 40 and then insert and lock the float 50 on the top of container 40 to retain the dispersant material in container 40. That is, the float 50 forms a lockable cover for the dispersant container 40 through the engagement of protrusions 58 and 58*a* with the elongated transverse slots in dispersant container 40. After the dispenser container 40 is capped one can nest the dispersant container 40 with the float 50 in the dispersant rate selector 45 and slip the transvere protrusion 43 on dispersant container 40 into the transverse elongated slot 48 on one side of dispenser selector 45 and an identical transverse protrusion located on the opposite side of container 40 and an identical transverse elongated slot located on the other side dispersant rate selector 45.

Figure 11:
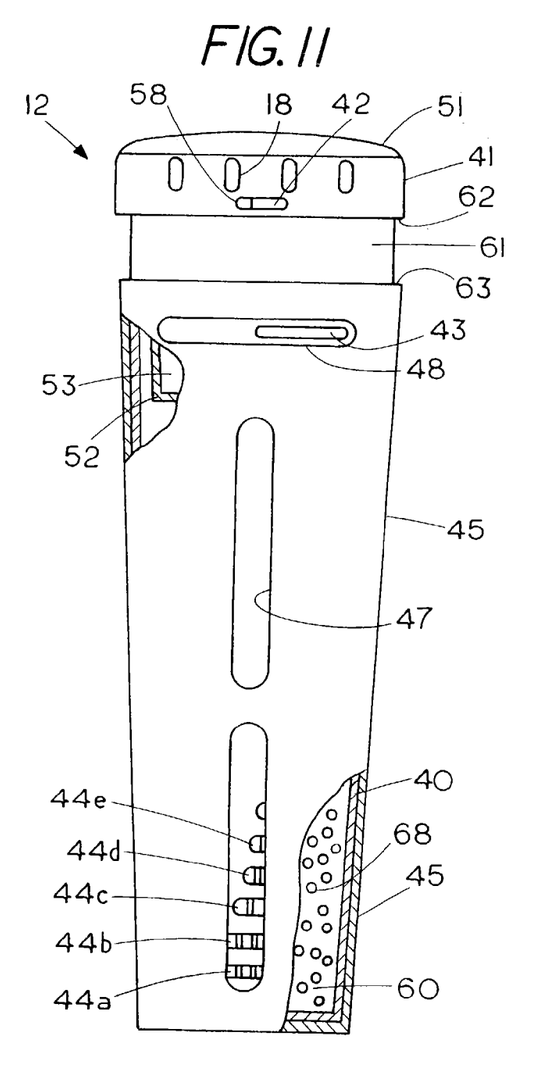
FIG. 11 is a front elevation view, partially in section, showing an assembled cartridge dispenser.

FIG. 11 shows an assembled view of cartridge dispenser 12 partially in section to reveal the location and interaction of the four component parts of the snap together cartridge dispenser 12. As can be seen in FIG. 11, the domed top portion of float cover 51 is located at the top of cartridge dispenser 12 and protrudes therefrom. The protrusion 58 on float cover 58 is engaged with the transverse slot 42 on dispenser container 40 to interlock the two together on one side and the protrusion 58*a* on float cover 51 and an identical transverse slot on other side interlock with each other so that the buoyancy of the float 50 can support the dispersant container 41 and the contents therein.

The dispersant rate selector member 45 is shown rotationally retained on dispersant container 40 by the inter-engagement of radial protrusion 43 into elongated slot 48. Similarly, a radial protrusion and elongated slot is located on the other side of dispenser cartridge 12 to permit the partial rotational displacement of dispersant rate selector 45 with respect to dispersant container 40. That is the length of the protrusion 43 in relation to the length of the slot 48 is such that one can partially rotate the rate selector 45 with respect to container 40 to bring more or less of the set of openings in container 40 into alignment with each other. FIG. 11 shows that the set of openings s 44*d*, 44*c* and 44*b* have been rotatinally positioned inline with slot 46 to permit fluid access to the dispersant material 58 in chamber 60 of dispersant container 40.

In the present invention the dispenser container 40 and in rate selector 45 have top portions that coact with each other to provide an annular recessed band 61. That is, member 41 has a first annular lip 62 on the lower side and selector 45 has a top annular lip 63. The annular recess formed between lip 62 on and lip 63 provides a space for positioning the stops 22, 23, 24 and 25, which are shown in FIG. 6, therein. That is, the height of stops 23, 24, 25 and 26 is such that the stops fit into the recess formed on band 61 so that the top edges of the stops engage the top lip 62 and the bottom edge of the stops engage the lower lip 63 to thereby hold the dispenser cartridge 12 in holder 11.

The stops 23, 24 and 25, which are mounted on a resilient cantilevered member are integrally formed from the material of holder 11 to provide for quick engagement and disengagement with the lips 62 and 63 thereby providing a latch to secure the holder 11 to the cartridge dispensers. This allows one to snap the dispenser cartridge 12 into holder 11 by merely forcing the cartridge 12 axially upward in the recess in the holder until the resilient members 26, 27 and 28 flex radially outward to allow stops 23, 24 and 25 and stop 22 on the opposite side to slip therepast until the stops can engage the lip 62. Once the stops are in the recesses of the band 61 the resilient members 26, 27 and 28 bend inward to bring the stops 23, 24 and 25 into position so that lips 62 and 63 prevent axial displacement. The use of resilient members 26, 27 and 28, which bend inward in response to an external force allows one to axially force the dispenser cartridge 12 into engagement with holder 11 through hand pressure alone or remove dispersant cartridge 12 from engagement with holder 11 by hand pressure alone by axially pulling on dispersant cartridge 12 with respect to holder 10. On the other hand, since an external force is required to remove the dispersant cartridge 12 from the holder 10, the dispersant cartridge 12 remains in holder 10 until such time as a user wishes to remove and replace the dispenser cartridge 12. This ensures that the holder 11 can maintain the cartridge 12 in position on the holder while the dispersant therein is made available to-the surrounding fluid.

Figure 12:
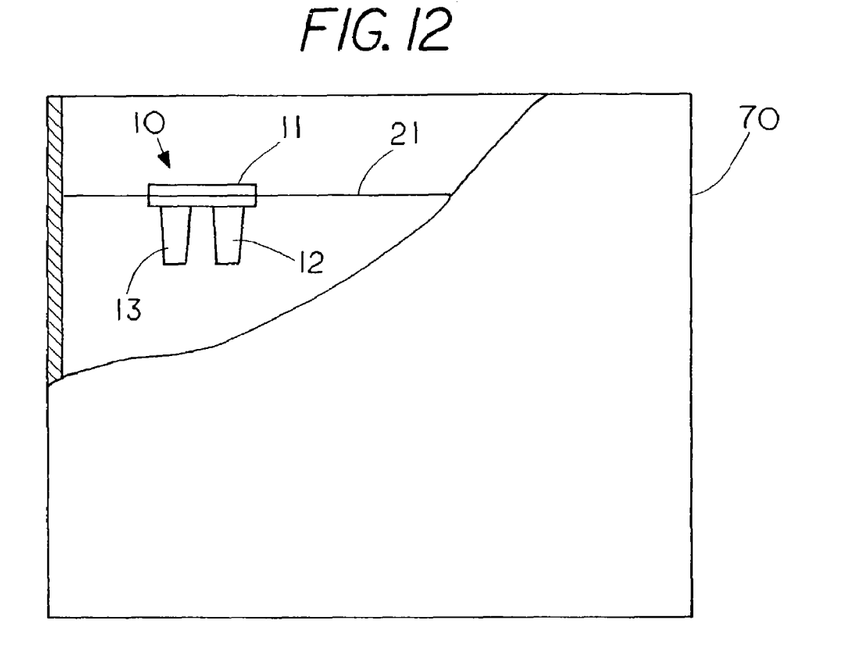
FIG. 12 is a partial cross sectional view of a container with the floating dispenser system located in a first orientation therein.

FIG. 12 shows a partial cross section view of a spa or hot tub 70 having the floating dispenser system 10 floating in a condition with a portion of the floating dispenser located above the water surface or water line 21 and a further portion below the water line. The dispenser cartridges 12 and 13, which are secured to the bottom side of holder 11, are located below the water line 21 in condition to provide a fluid port to enable ingress and egress of the dispersant from the cartridge dispensers.

Figure 13:
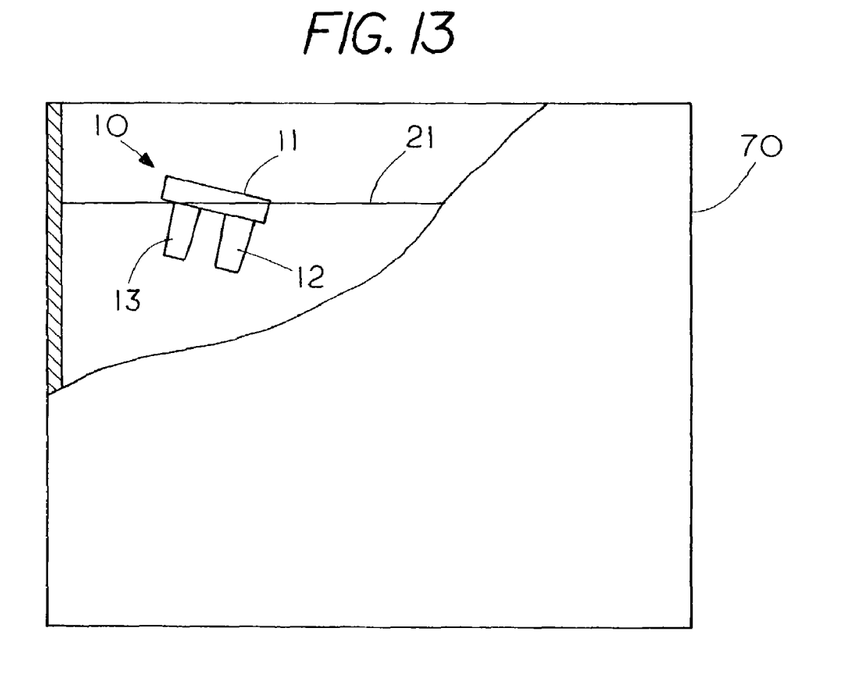
FIG. 13 is a partial cross sectional view of a container of FIG. 12 with the floating dispenser system of FIG. 12 located in a second orientation.

FIG. 13 shows the condition of the floating dispenser 10 when one of the cartridges contains a dissoluble material and the other contains a non-dissoluble material. For example, container 12 can contain the minerals which are used to purify the water. Typically, the minerals remain as the ions from the minerals are released into the water to kill the bacteria. The other dispenser 13 can contain a stick of bromine. When the floating dispenser 10 with full dispersant cartridges is placed in the tub the dispenser system 10 floats in a first orientation as shown in FIG. 12. Once the bromine dissolve the floating dispenser 10 becomes empty and reorients to a-second ordination as shown in FIG. 13. That is, the minerals remain at substantially the same weight since only the ions are being removed from the minerals while the entire bromine stick is being dissolved into the water. The result is that the dispersant container 13, which held the bromine, becomes lighter causing the floating dispenser 10 to list and float at a second orientation and thus alerts a user to the fact that the dissoluble dispersant has been spent and needs to be replenished.

While the floating dispenser system 10 has been shown with two dispenser cartridges it is envisioned that in certain instance additional cartridge dispensers can be used in the floating dispensing system, for example one may want to introduce another dispensing material or one may wish to merely have additional dispensing material available.

We claim:

1. A floating dispensing system comprising:
a cartridge holder, said cartridge holder having a top side and a bottom side, said top side normally located above a water line and said bottom side normally located below the water line;
a first buoyant cartridge, said cartridge containing a first water treatment material, said first buoyant cartridge temporarily securable to the bottom side of said cartridge holder to enable dispensing of water treatment material therefrom;
a second buoyant cartridge, said second cartridge containing a second water treatment material, said second buoyant cartridge securable to the bottom side of said cartridge holder to enable dispensing of water treatment material therefrom to enable either or both of said cartridges to dispense water treatment material therefrom as the cartridge holder floats in a body of water.

2. The floating dispensing system of claim 1 wherein the bottom side includes a first recess with a latch therein for securing one of said cartridges therein.

3. The floating dispensing system of claim 1 wherein the first cartridge and the second cartridge have a cylindrical top and said cartridge holder holds said first cartridge and said second cartridge in a side by side condition.

4. The floating dispensing system of claim 1 wherein the first cartridge contains minerals.

5. The floating dispensing system of claim 1 wherein the second cartridge contains bromine.

6. The floating dispensing system of claim 1 wherein the first cartridge includes a dispersant rate selector for controlling a size of a water access path to an interior of the first cartridge.

7. The floating dispensing system of claim 6 wherein second cartridge includes a dispersant rate selector for controlling a size of a water access pass to an interior of the second cartridge.

8. The floating dispensing system of claim 1 wherein each of said cartridges contain a float to provide buoyancy to each of the cartridges.

9. The floating dispensing system of claim 1 wherein each of the cartridges are sealed to prevent access to the water treatment material therein.

10. The floating dispensing system of claim 1 wherein each of the cartridges have a central axis and each of the cartridges floats with the central axis thereof in a vertical orientation when the material therein is in an unspent condition.

11. The floating dispensing system of claim 1 wherein the cartridge holder and the cartridges are comprised of a polymer plastic.

12. The method of treating water in a spa, pool or hot tub comprising:
attaching a first cartridge dispenser, having a first water treatment material therein to a holder;
attaching a second cartridge dispenser having a second water treatment material therein to the holder;
placing the holder in a body of water in a spa, pool or hot tub wherein the holder and cartridge dispensers contain sufficient buoyancy so that the holder floats at least partially above a water line and each of the cartridge dispensers extend below the water line.

13. The method of claim 12 including the step of adjusting a size of an opening into said first cartridge dispenser to control the amount of water treatment material dispensed therefrom.

14. The method of claim 13 including the step of adjusting a size of an opening into said second cartridge dispenser to control the amount of water treatment material dispensed therefrom.

15. The method of claim 12 including the step of forming the first cartridge and the second cartridge each with a buoyant top chamber to assist in buoyantly supporting the first cartridge and the second cartridge.

16. The method of claim 12 including the step of placing a water treatment material comprises placing a halogen in one of said cartridges and placing a mineral in the other of said cartridges.

17. The method of claim 12 including the step of removing a spent first cartridge dispenser and replacing said spent first cartridge dispenser with a fresh cartridge dispenser while retaining the second cartridge dispenser in said buoyant head.

18. The method of claim 12 including the step of sealing each of the cartridges to by a mechanical inter lock to prevent a direct access to the water treatment material contained therein.

19. A floating dispensing system comprising:
a holder;

a first cartridge secured to said holder, said first cartridge containing a first dispersant therein;

a second cartridge secured to said holder, said second cartridge containing a second dispersant therein so that said first and second cartridge can dispense the dispersant therefrom as the holder and cartridges float in a liquid.

20. The floating dispensing system of claim 19 wherein the first cartridge contains a dissoluble dispersant and the second cartridge contains a non dissoluble dispersant with said floating dispensing system floating in a first orientation when the dispersant are in an unspent condition and in a second orientation when the dissolvable dispersant is in a spent condition so that one can determine whether the cartridge with the dissoluble dispersant is spent by observing the orientation the floating dispensing system.

21. The floating dispensing system of claim 19 wherein the first cartridge and said second cartridge are releasably secured to said head to permit replacement of either or both of said cartridges.

22. The floating dispensing system of claim 19 wherein the first cartridge contains an ion releasing material and the second cartridge contains bromine.

23. The floating dispensing system of claim 19 wherein the first cartridge contains a rotatable selector to adjust the amount of material dispensed therefrom.

* * * * *